US011340516B2

United States Patent
Kuroki

(10) Patent No.: US 11,340,516 B2
(45) Date of Patent: May 24, 2022

(54) LENS HOOD AND IMAGING APPARATUS

(71) Applicant: Panasonic Intellectual Property Management Co., Ltd., Osaka (JP)

(72) Inventor: Hiroyuki Kuroki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 23 days.

(21) Appl. No.: 17/151,709

(22) Filed: Jan. 19, 2021

(65) Prior Publication Data

US 2021/0223665 A1 Jul. 22, 2021

(30) Foreign Application Priority Data

Jan. 22, 2020 (JP) .............................. JP2020-008573

(51) Int. Cl.
 *G03B 11/04* (2021.01)
(52) U.S. Cl.
 CPC .................................. *G03B 11/045* (2013.01)
(58) Field of Classification Search
 CPC .............................. G03B 11/04; G03B 11/045
 USPC .......................................... 396/534; 359/611
 See application file for complete search history.

(56) References Cited

U.S. PATENT DOCUMENTS

| 2009/0147127 | A1 | 6/2009 | Ogawa | |
|---|---|---|---|---|
| 2009/0323188 | A1* | 12/2009 | Nomura | G02B 27/0006 |
| | | | | 359/511 |
| 2013/0170037 | A1* | 7/2013 | Iizuka | G03B 11/043 |
| | | | | 359/511 |
| 2015/0131985 | A1 | 5/2015 | Shodai | |

FOREIGN PATENT DOCUMENTS

| JP | H06-242494 A | 9/1994 |
|---|---|---|
| JP | 2001-140557 A | 5/2001 |
| JP | 2006-195418 A | 7/2006 |
| JP | 2008-228909 A | 10/2008 |
| JP | 2012-062159 A | 3/2012 |
| JP | 2015-111240 A | 6/2015 |

* cited by examiner

Primary Examiner — Christopher E Mahoney
(74) Attorney, Agent, or Firm — Renner, Otto, Boisselle & Sklar, LLP

(57) ABSTRACT

A lens hood includes: a casing provided with a through-hole; first and second rotary frames which are arranged side by side in an opening direction of the through-hole and rotate in opposite directions in conjunction with each other; and first and second lens covers which approach or separate from each other to open and close the through-hole. The first lens cover includes a first connection portion that is provided on one end side and rotatably connected to the first rotary frame, and a second connection portion that is provided on the other end side and rotatably connected to the second rotary frame. The second lens cover includes a third connection portion that is provided on one end side and rotatably connected to the second rotary frame and a fourth connection portion that is provided on the other end side and rotatably connected to the first rotary frame.

7 Claims, 20 Drawing Sheets

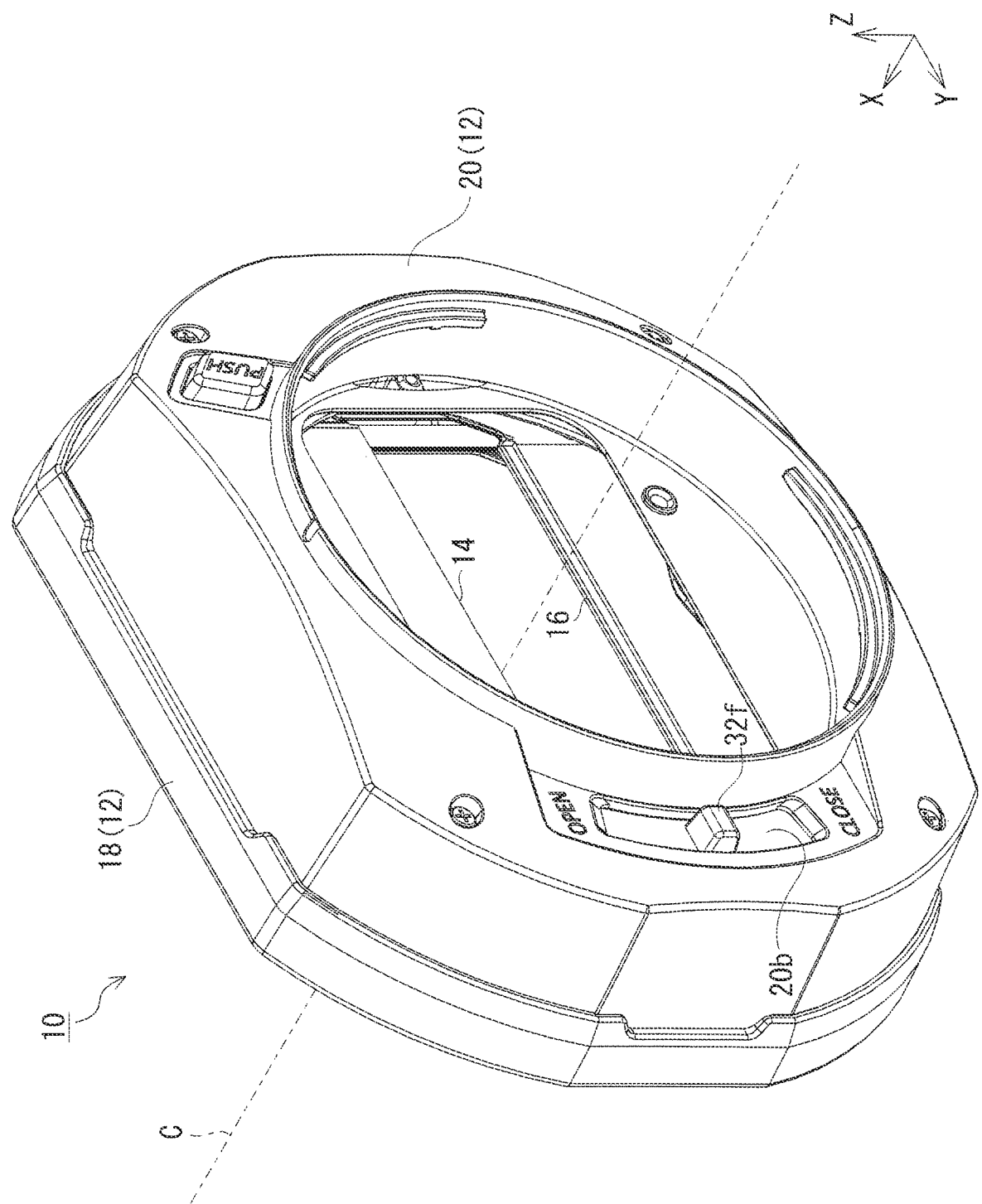

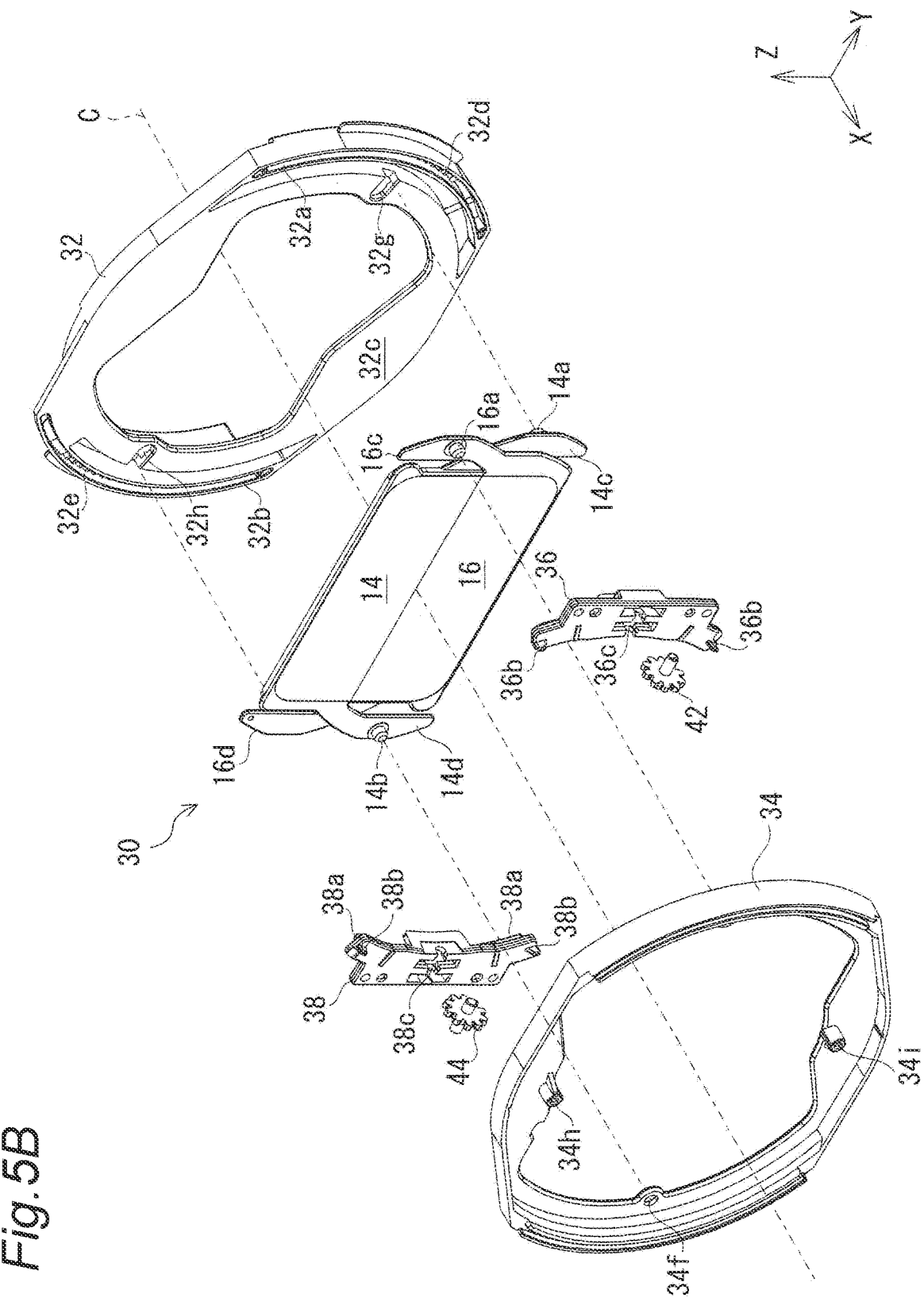

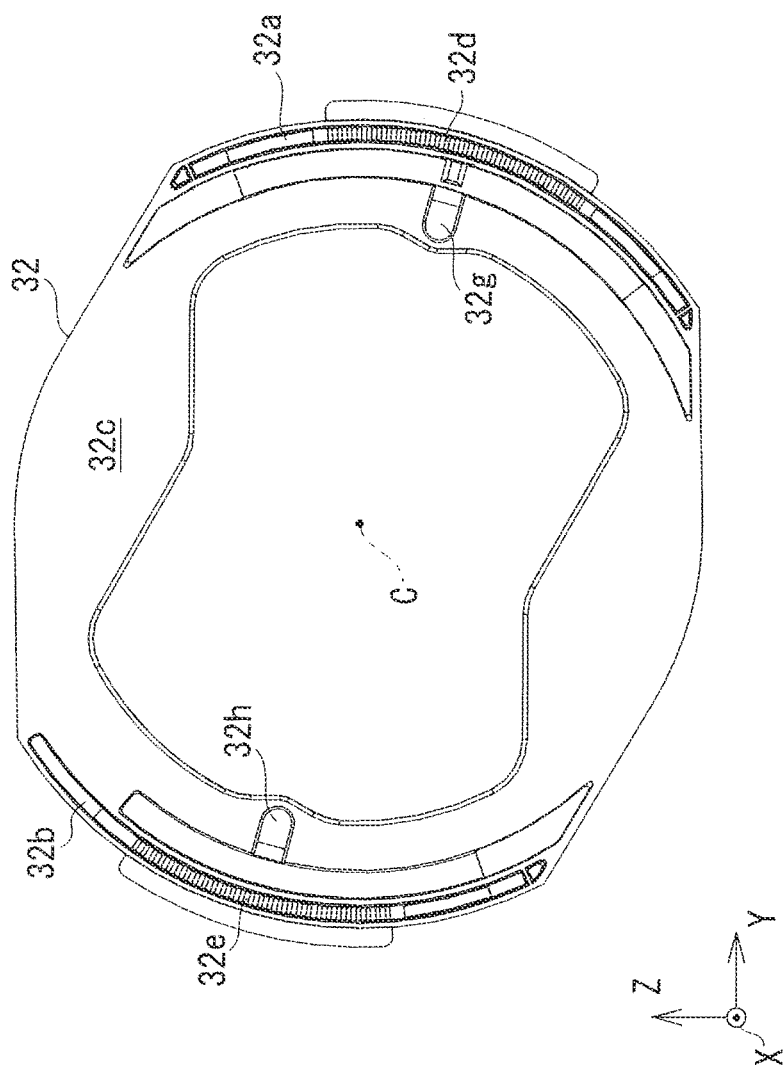

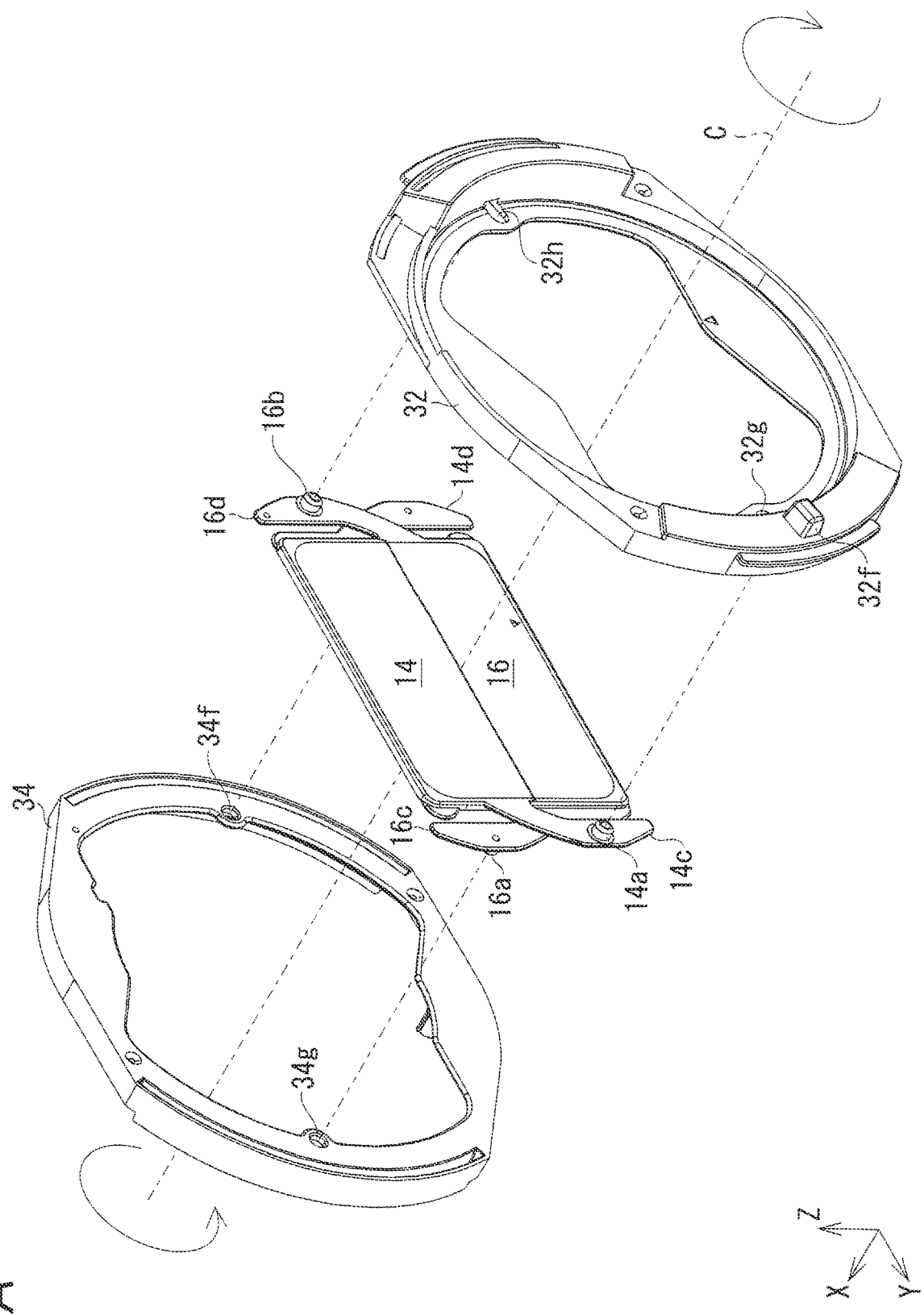

LENS HOOD AND IMAGING APPARATUS

BACKGROUND OF THE INVENTION

Field of the Invention

The present disclosure relates to a lens hood and an imaging apparatus including the same.

Description of the Related Art

For example, JP 2015-111240 A discloses a lens hood attached to a lens barrel of an imaging apparatus. The lens hood includes two lens covers that selectively cover and protect lenses in the lens barrel of the imaging apparatus. Each of the lens covers has a curved shape that is curved in a side view (view along a left-right direction). As each of the lens covers rotates about a rotation center line extending in the left-right direction, the lens covers approach or separate from each other to cover or expose the lenses.

SUMMARY OF THE INVENTION

In the case of the lens hood described in JP 2015-111240 A, however, each of the lens covers moves forward (that is, toward a subject) if each of the curved lens covers rotates from a fully closed state. Therefore, as sizes of lenses protected by the lens cover of the lens hood increases, a size of the lens cover increases, and the amount of forward movement of the lens cover increases. As a result, a size of the lens hood increases, particularly, the size in the front-rear direction increases. Therefore, it is difficult to reduce the size of the lens hood described in JP 2015-111240 A Therefore, an object of the present disclosure is to reduce a size of a lens hood including a lens cover.

In order to solve the above problem, according to one aspect of the present disclosure, provided is a lens hood including: a casing provided with a through-hole; first and second rotary frames which are arranged side by side in an opening direction of the through-hole and rotate in opposite directions in conjunction with each other; and first and second lens covers which approach or separate from each other to close or open the through-hole. The first lens cover includes a first connection portion that is provided on one end side and rotatably connected to the first rotary frame, and a second connection portion that is provided on another end side and rotatably connected to the second rotary frame. The second lens cover includes a third connection portion that is provided on one end side and rotatably connected to the second rotary frame, and a fourth connection portion that is provided on another end side and rotatably connected to the first rotary frame.

Further, according to another aspect of the present disclosure, provided is an imaging apparatus including: the lens hood described above; and a lens barrel to which the lens hood is attached.

According to the present disclosure, it is possible to reduce the size of the lens hood including the lens cover.

BRIEF DESCRIPTION OF THE DRAWINGS

FIG. 3B is a rear perspective view of the lens hood in a half-open state;

FIG. 5B is an exploded front perspective view of the lens barrier unit;

FIG. 6 is a front view of a first rotary frame;

FIG. 9A is a perspective view illustrating first and second lens covers and the first and second rotary frames in the fully closed state;

DESCRIPTION OF THE PREFERRED EMBODIMENT(S)

Hereinafter, embodiments will be described in detail with reference to the drawings as appropriate. However, detailed descriptions more than necessary will be omitted in some cases. For example, detailed descriptions of already well-known matters and duplicate descriptions for substantially the same configuration will be omitted in some cases. A reason thereof is to avoid unnecessary redundancy of the following description and to facilitate the understanding of those skilled in the art.

Note that the inventor(s) provides the accompanying drawings and the following description in order for those skilled in the art to fully understand the present disclosure, and does not intend to limit the subject described in the claims by these.

Hereinafter, lens hoods according to embodiments of the present disclosure will be described with reference to the drawings.

First Embodiment

Figure 1:
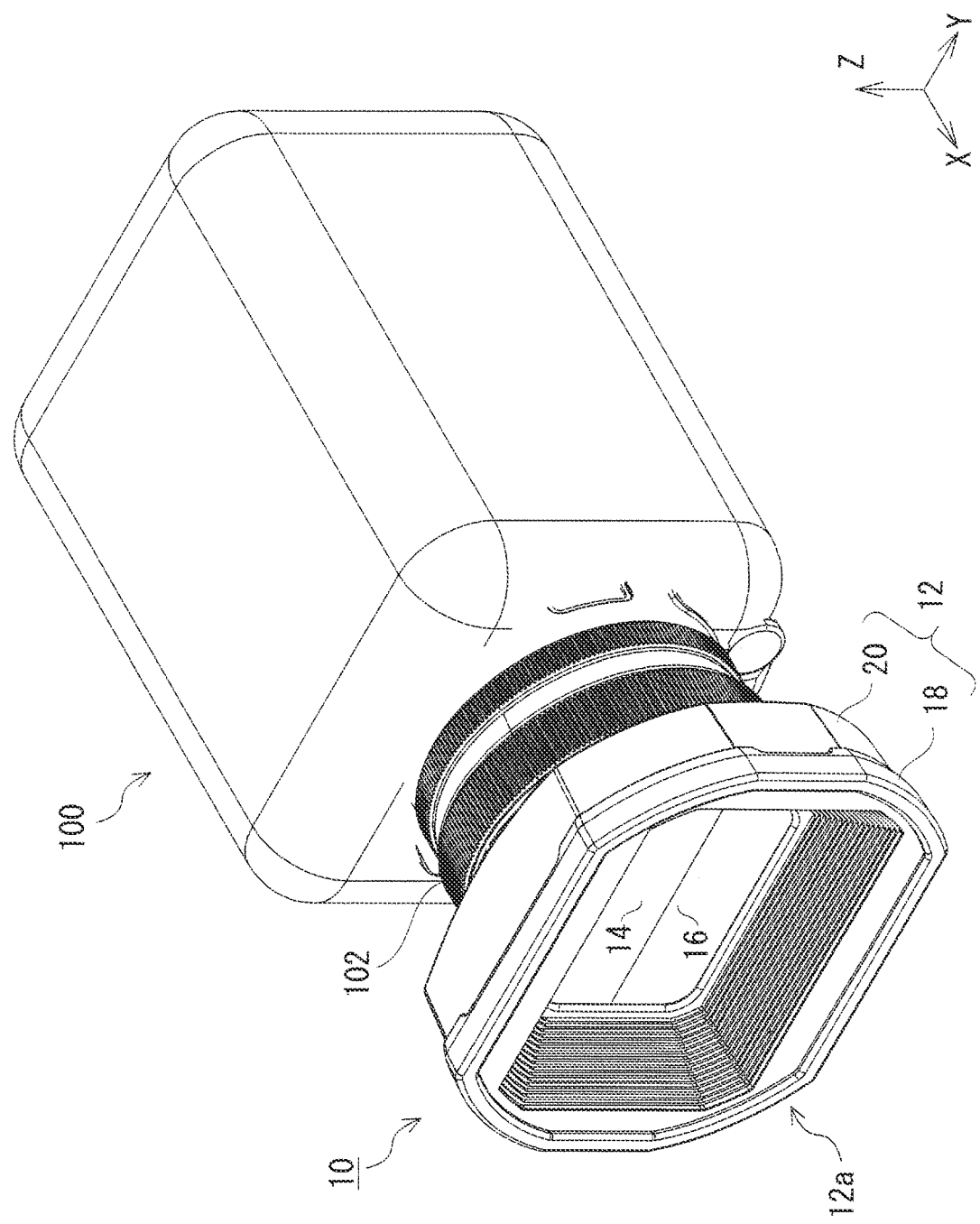
FIG. 1 is a perspective view of an imaging apparatus equipped with a lens hood according to a first embodiment of the present disclosure.
Figure 2:
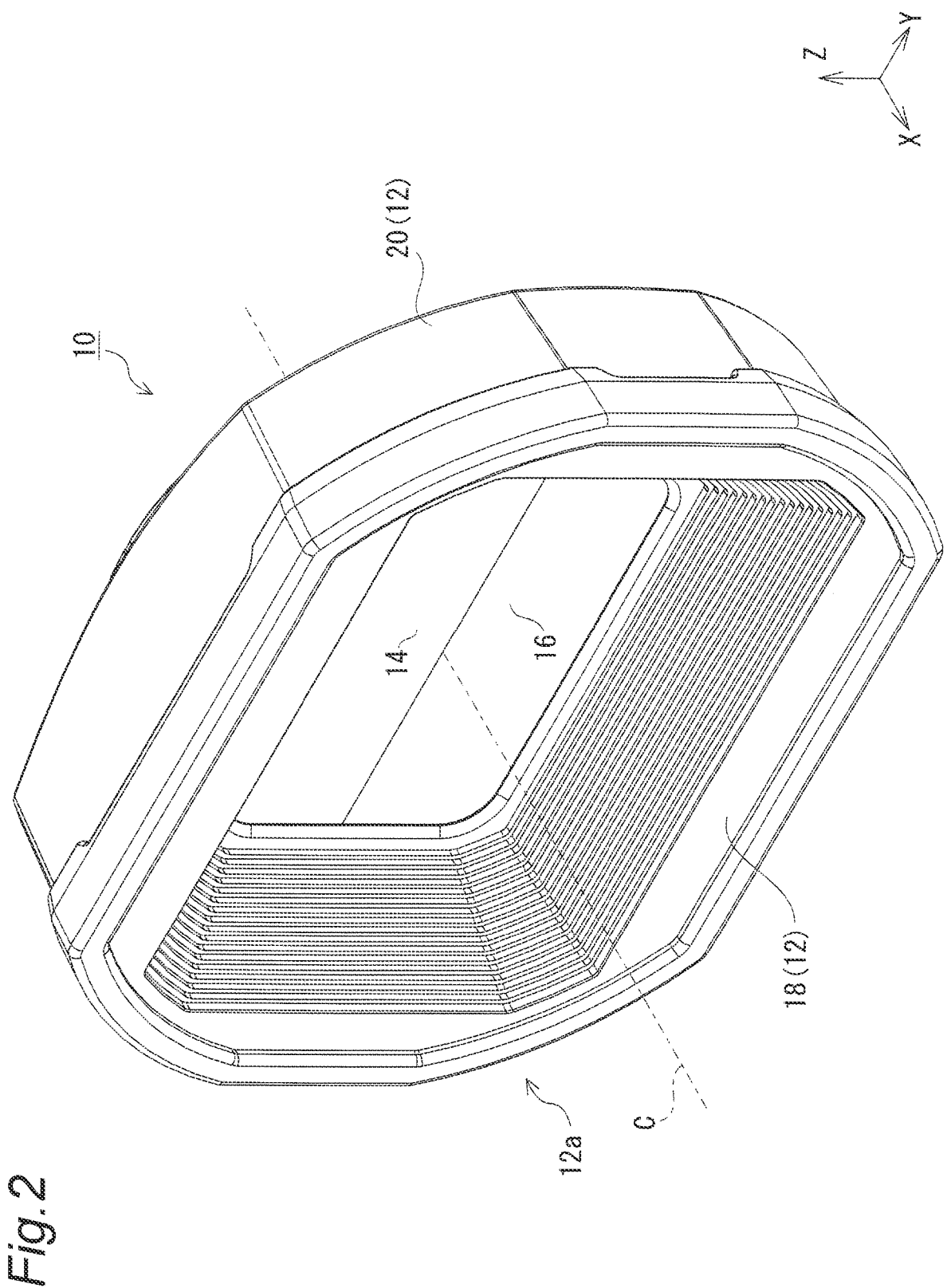
FIG. 2 is a front perspective view of the lens hood.
Figure 3A:
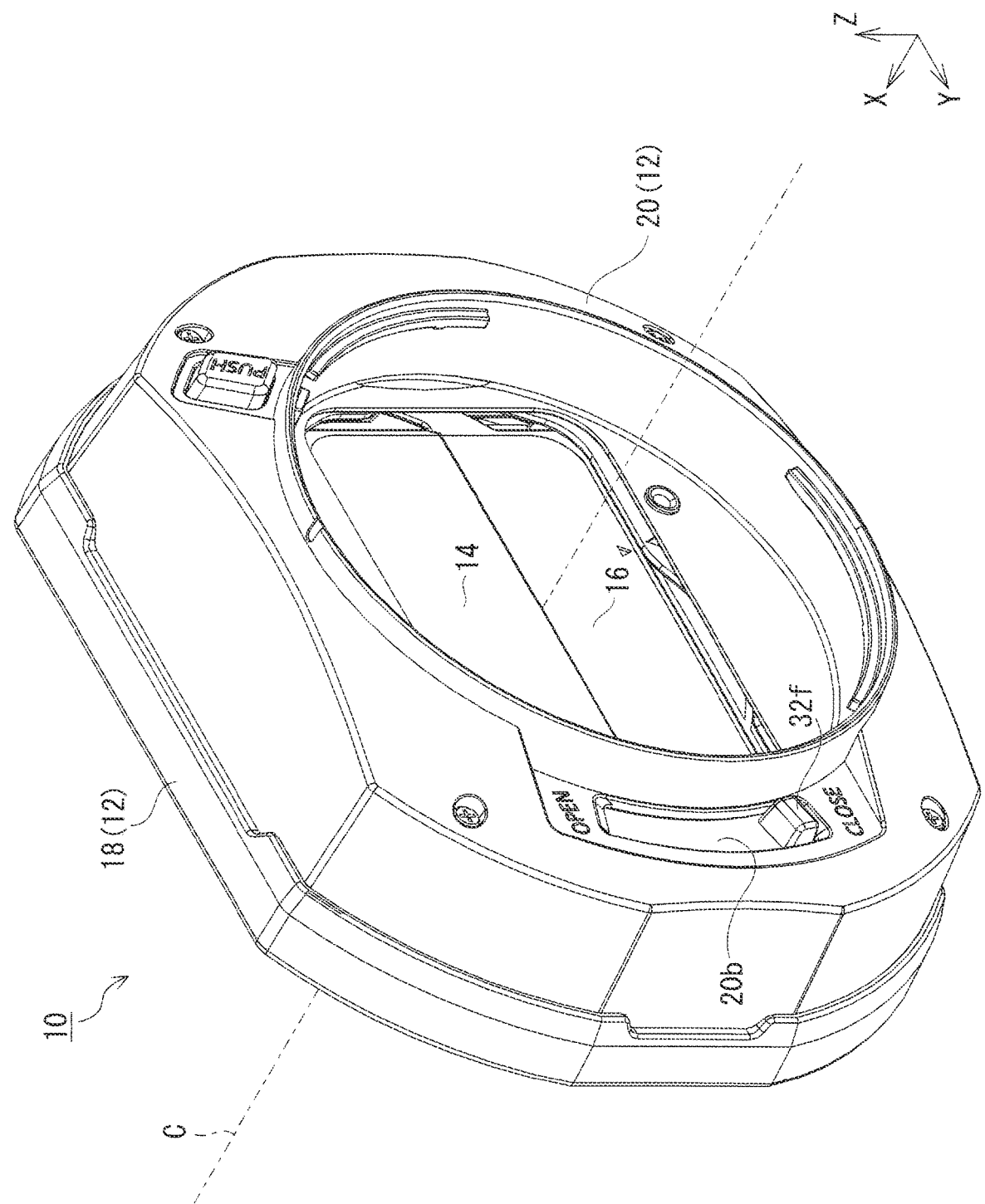
FIG. 3A is a rear perspective view of the lens hood in a fully closed state.
Figure 3C:
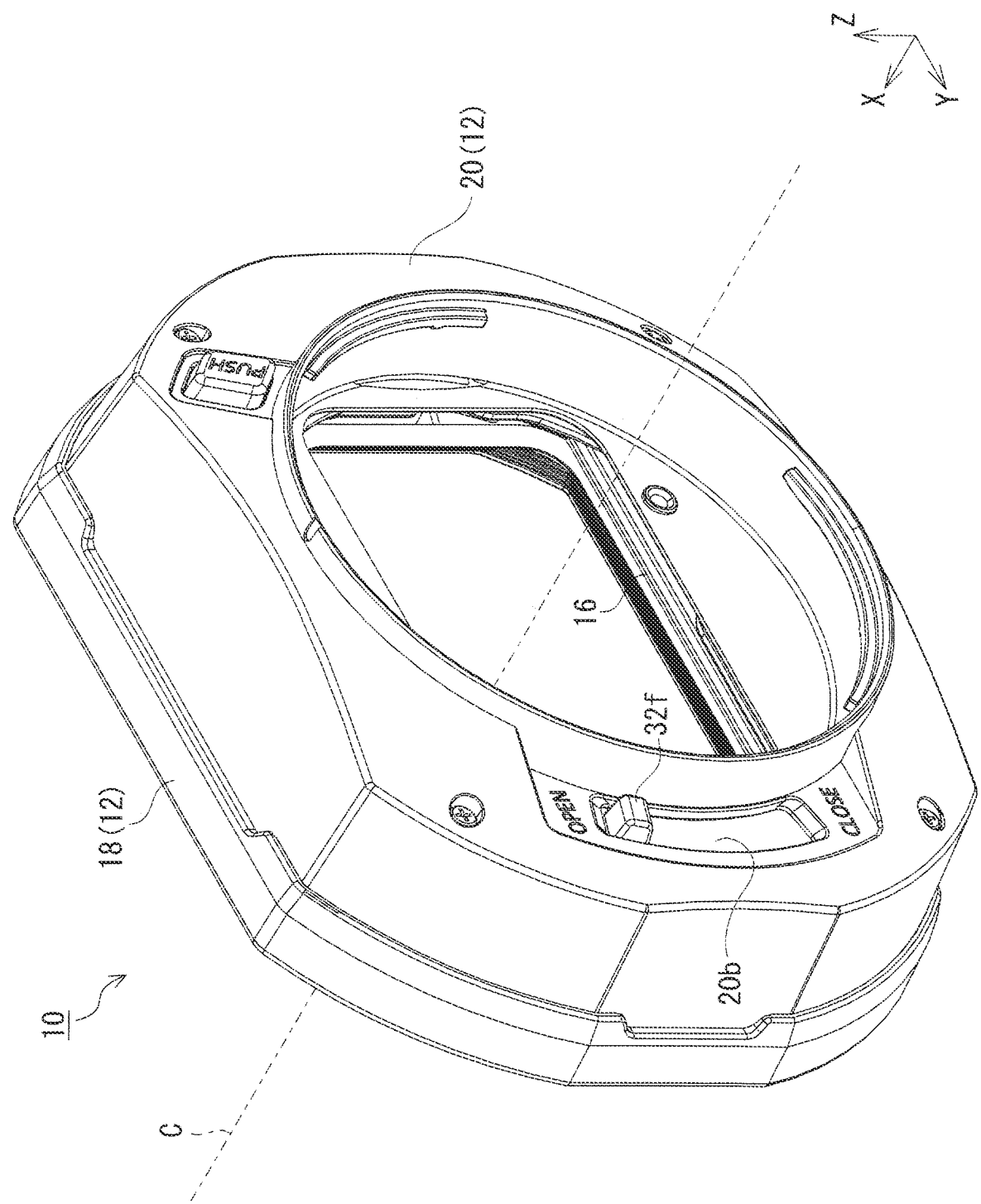
FIG. 3C is a rear perspective view of the lens hood in a fully open state.

FIG. 1 is a perspective view of an imaging apparatus equipped with a lens hood according to a first embodiment of the present disclosure. FIG. 2 is a front perspective view of the lens hood. FIGS. 3A to 3C are rear perspective views of the lens hood.

Note that an X-Y-Z coordinate system illustrated in the drawings is given to facilitate the understanding of the present disclosure, and does not limit the present disclosure. An X-axis direction indicates a front-rear direction of the lens hood, a Y-axis indicates a left-right direction, and a Z-axis direction indicates an up-down direction. In the present specification, a side where a subject to be imaged by an imaging apparatus exists is referred to as a "front side", and a side where the imaging apparatus exists is referred to as a "rear side".

As illustrated in FIG. 1, a lens hood 10 according to the first embodiment is used by being permanently or detachably attached to a distal end of a lens barrel 102 of an imaging apparatus 100. As a result, the lens hood 10 prevents unnecessary light from entering a lens of the lens barrel 102, and selectively covers and protects the lens.

For this reason, the lens hood 10 includes a casing 12 provided with a through-hole 12a, and first and second lens covers 14 and 16 that are provided in the casing 12 and approach or separate from each other to close or open the through-hole 12a as illustrated in FIG. 2.

As illustrated in FIGS. 1 and 2, in the case of the first embodiment, the casing 12 of the lens hood 10 includes the through-hole 12a having a rectangular opening whose size in the left-right direction (Y-axis direction) is larger than the size in the up-down direction (Z-axis direction). An image of the subject is incident on the lens in the lens barrel 102 of the imaging apparatus 100 through the through-hole 12a.

As illustrated in FIGS. 3A to 3C, the first and second lens covers 14 and 16 are flat plate-shaped members that intersect with (are orthogonal to in the case of the first embodiment) an opening direction (X-axis direction) of the through-hole 12a of the casing 12.

Further, FIG. 3A illustrates the lens hood 10 in which the first and second lens covers 14 and 16 are in a fully closed state. Further, FIG. 3B illustrates the lens hood 10 in which the first and second lens covers 14 and 16 are substantially in a half-open state. FIG. 3C illustrates the lens hood 10 in which the first and second lens covers 14 and 16 are in a fully open state. As illustrated in these figures, the respective first and second lens covers 14 and 16 are provided in the casing 12 of the lens hood 10 so as to be movable in the direction (Z-axis direction) intersecting with the opening direction (X-axis direction) of the through-hole 12a. Further details of these lens covers will be described later.

Figure 4:
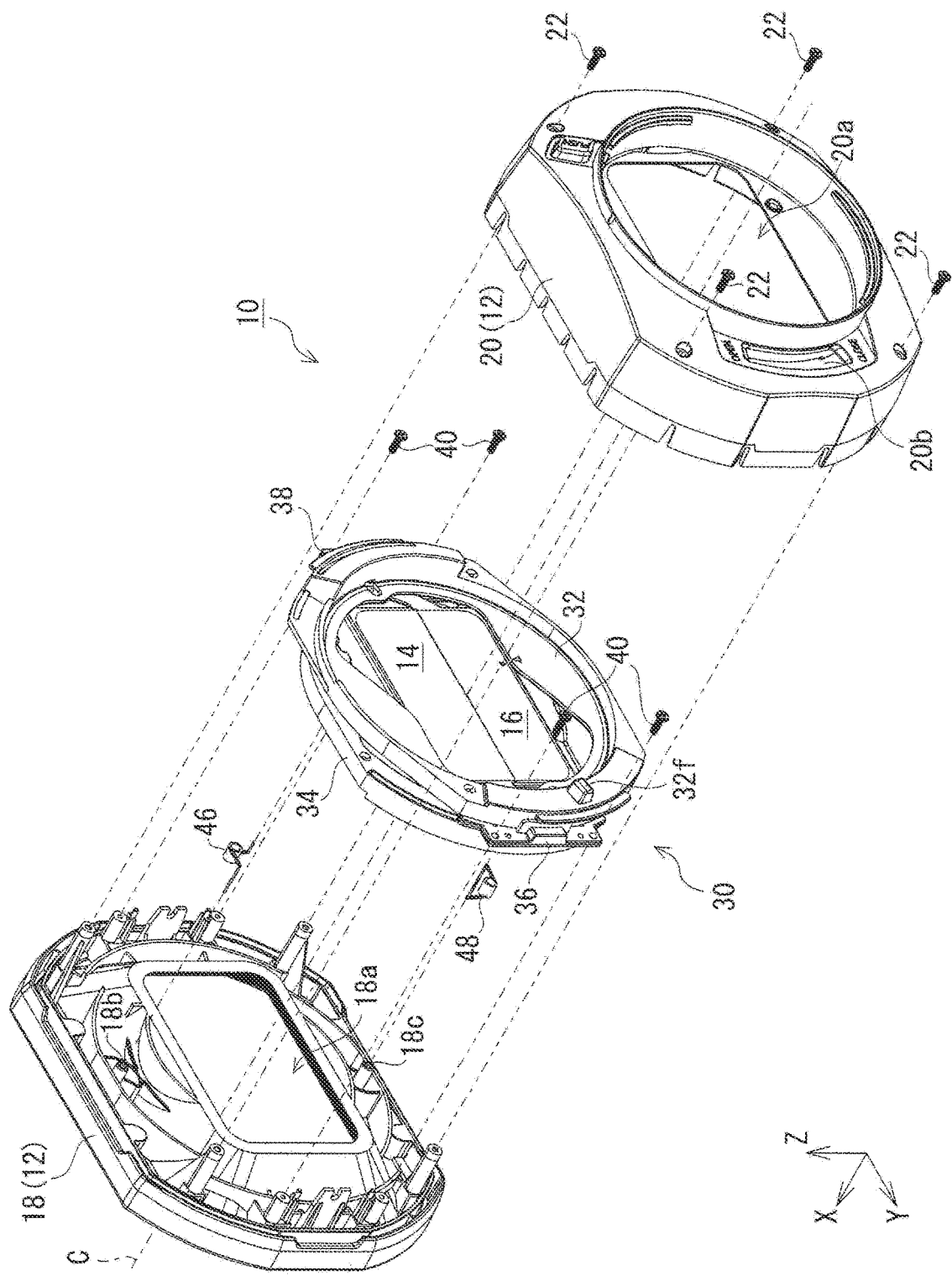
FIG. 4 is an exploded rear perspective view of the lens hood.

FIG. 4 is an exploded rear perspective view of the lens hood.

As illustrated in FIG. 4, the casing 12 of the lens hood 10 is constituted by a front casing 18 and a rear casing 20 in the case of the first embodiment. The front casing 18 and the rear casing 20 include through-holes 18a and 20a, respectively. The casing 12 including the through-hole 12a is formed by fixing the rear casing 20 to the front casing 18 using a plurality of screws 22.

A lens barrier unit 30 including the first and second lens covers 14 and 16 is incorporated in the casing 12 constituted by the front casing 18 and the rear casing 20.

Figure 5A:
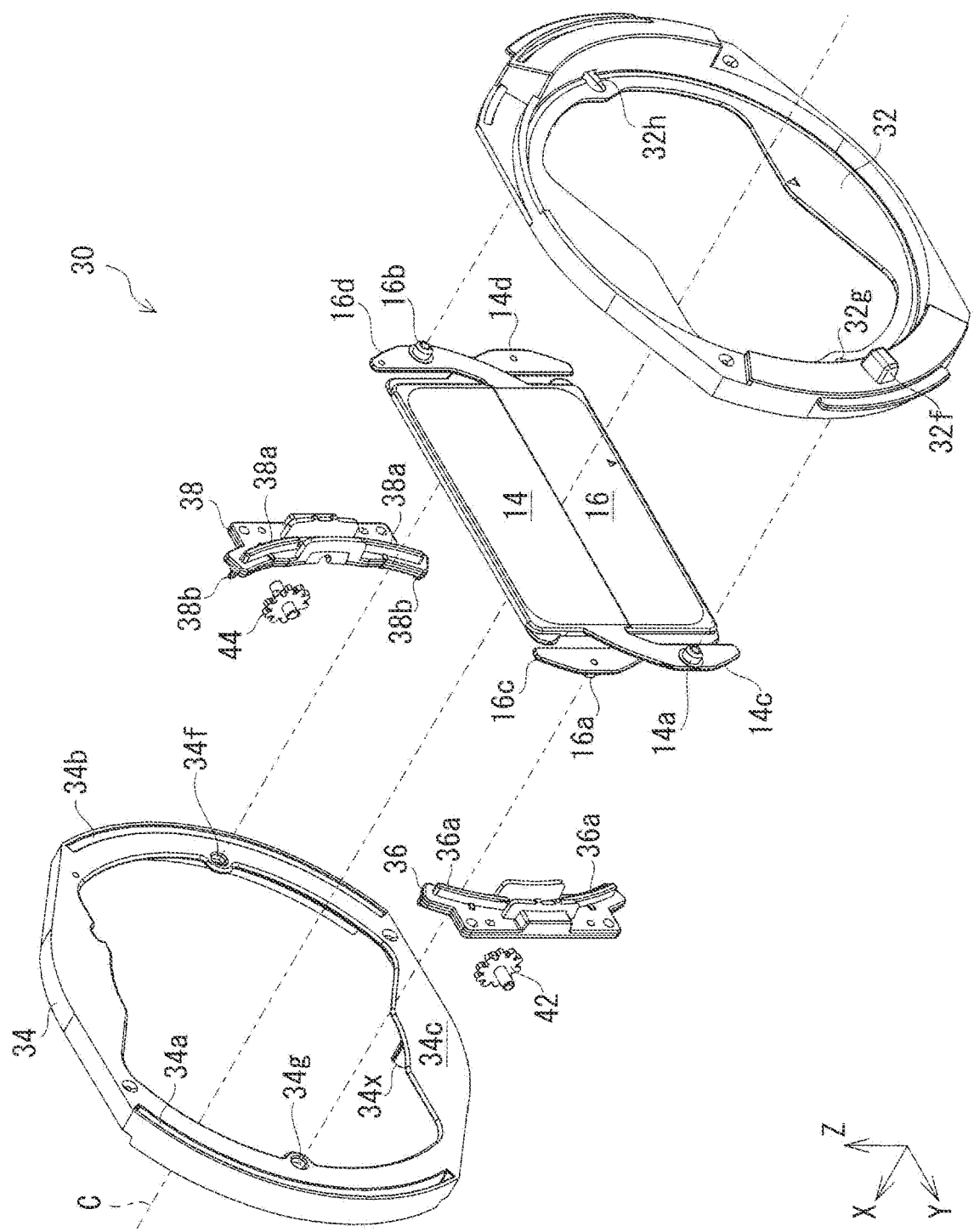
FIG. 5A is an exploded rear perspective view of a lens barrier unit.

FIG. 5A is a front perspective view of the lens barrier unit, and FIG. 5B is a rear perspective view of the lens barrier unit.

The lens barrier unit 30 illustrated in FIGS. 5A and 5B is a unit configured to bring or separate the first and second lens covers 14 and 16 close to or from each other. Specifically, the lens barrier unit 30 includes not only the first and second lens covers 14 and 16 but also first and second rotary frames 32 and 34 configured to move these lens covers.

As illustrated in FIGS. 5A and 5B, the first and second lens covers 14 and 16 are rectangular and flat plate-shaped members in the case of the first embodiment. In the state of approaching and coming in contact with each other (that is, in the fully closed state), a lower end of the first lens cover 14 comes into contact with an upper end of the second lens cover 16.

FIG. 6 is a front view of the first rotary frame 32. Further, FIG. 7 is a rear view of the second rotary frame 34.

Figure 7:
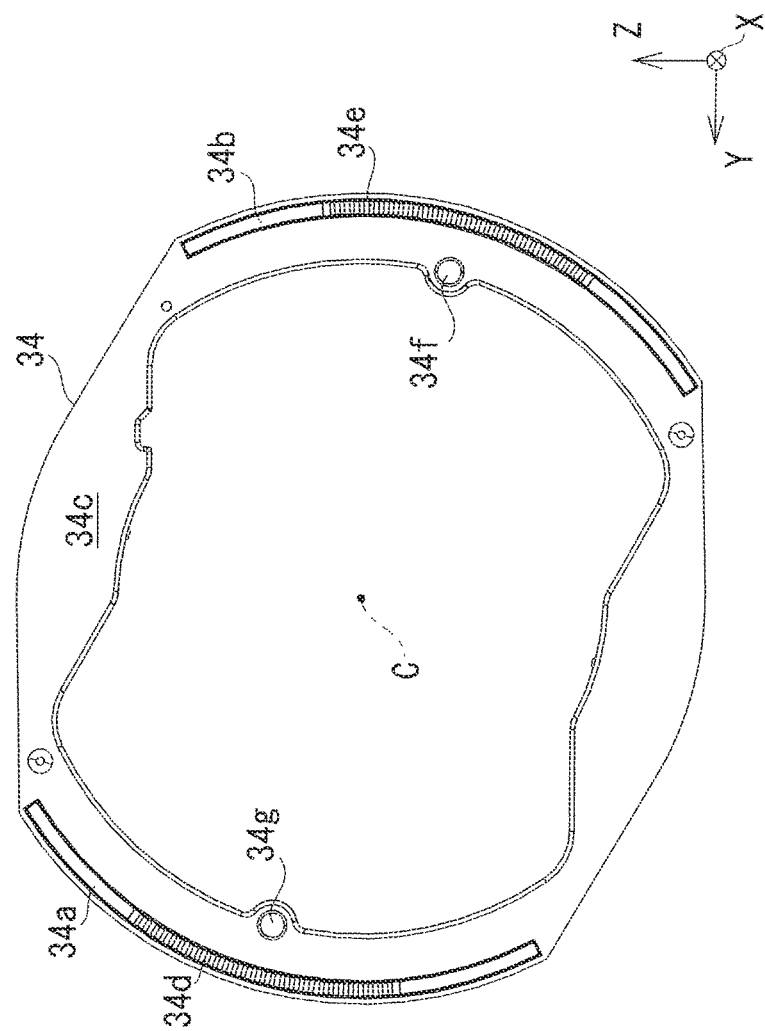
FIG. 7 is a rear view of a second rotary frame.

As illustrated in FIGS. 6 and 7, the first and second rotary frames 32 and 34 are frame-shaped members. As illustrated in FIGS. 5A and 5B, the first and second rotary frames 32 and 34 are arranged side by side in the opening direction (X-axis direction) of the through-hole 12a of the casing 12 to oppose each other with the first and second lens covers 14 and 16 interposed therebetween. Although details will be described later, the first and second rotary frames 32 and 34 rotate in opposite directions in conjunction with each other.

Specifically, in the case of the first embodiment, the first and second rotary frames 32 and 34 rotate in opposite directions about a common rotation center line C extending in the opening direction (X-axis direction) of the through-hole 12a of the casing 12. When the first rotary frame 32 rotates in the clockwise-rotation direction about the rotation center line C, the second rotary frame 34 rotates in a counterclockwise-rotation direction in conjunction therewit.

In the case of the present embodiment, the lens barrier unit 30 includes guide members 36 and 38 that guide the first and second rotary frames 32 and 34 in order to rotate the first and second rotary frames 32 and 34 about the common rotation center line C.

The guide members 36 and 38 are arranged so as to oppose each other with the rotation center line C interposed therebetween, and include arcuate ridge portions 36a and 38a on a side of the first rotary frame 32 (that is, rear surfaces). Arcuate grooves 32a and 32b that engage with the arcuate ridge portions 36a and 38a are formed on a front surface 32c of the first rotary frame 32. As being guided by the guide members 36 and 38, the first rotary frame 32 rotates about the rotation center line C.

Further, the guide members 36 and 38 include a plurality of ridge portions 36b and 38b on a side of the second rotary frame 34 (that is, front surfaces). Arcuate grooves 34a and 34b that engage with the ridge portions 36b and 38b are formed on a rear surface 34c of the second rotary frame 34. As being guided by the guide members 36 and 38, the second rotary frame 34 rotates about the rotation center line C.

Note that the guide members 36 and 38 are fixed to the front 2; casing 18 by a plurality of screws 40 as illustrated in FIG. 4.

In the case of the first embodiment, the lens barrier unit 30 includes a rack and pinion mechanism in order to rotate the first and second rotary frames 32 and 34 in the opposite directions in conjunction with each other.

Specifically, as illustrated in FIGS. 5A and 5B, the lens barrier unit 30 includes a plurality of pinion gears 42 and 44 which are arranged between the first rotary frame 32 and the second rotary frame 34 and oppose each other with the rotation center line C of these rotary frames interposed between. The pinion gears 42 and 44 are housed in gear housing portions 36c and 38c of the guide members 36 and 38.

Rack teeth that engage with the pinion gears 42 and 44 are formed on the first and second rotary frames 32 and 34. As illustrated in FIGS. 6 and 7, rack teeth 32*d* and 34*d* that engage with one pinion gear 42 are provided in the arcuate grooves 32*a* and 34*a*. Further, rack teeth 32*e* and 34*e* that engage with the other pinion gear 44 are provided in the arcuate grooves 32*b* and 34*b*.

Figure 8:
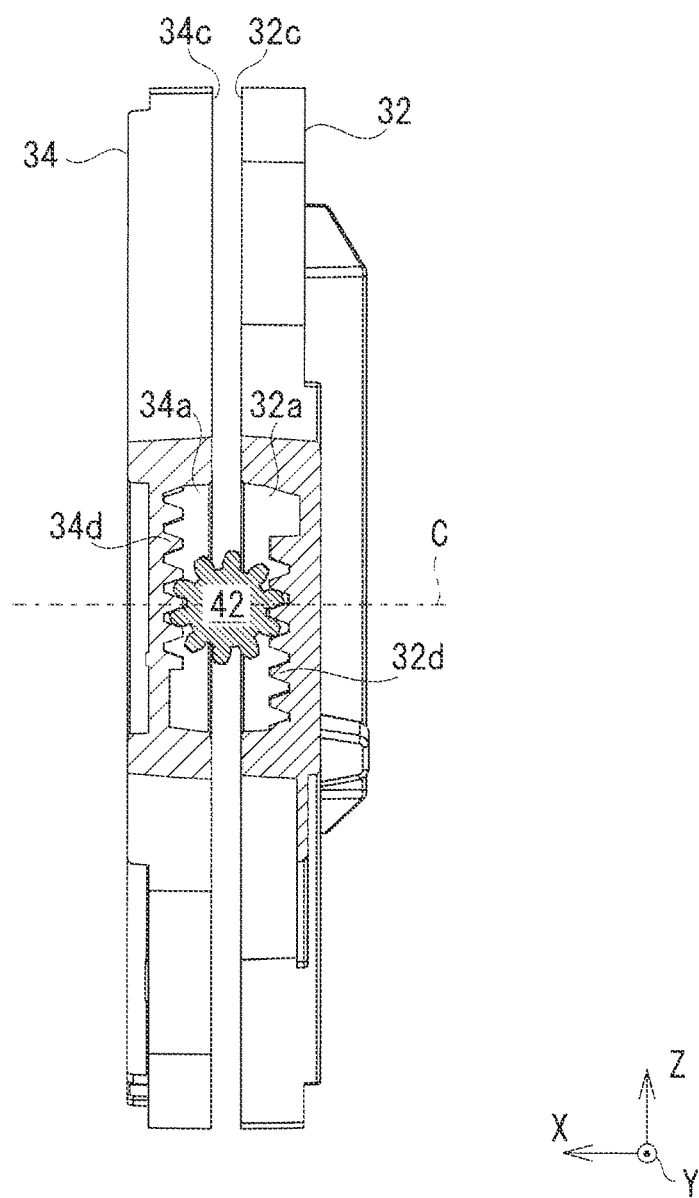
FIG. 8 is a partial cross-sectional view illustrating a drive connection between the first rotary frame and the second rotary frame.

FIG. 8 is a partial cross-sectional view illustrating a drive connection between the first rotary frame and the second rotary frame.

As illustrated in FIG. 8, the rack teeth 32*d* of the first rotary frame 32 and the rack teeth 34*d* of the second rotary frame 34 interpose the pinion gear 42. As a result, when the rack teeth 32*d* of the first rotary frame 32 ascends, the pinion gear 42 rotates to lower the rack teeth 34*d* of the second rotary frame 34. With such a rack and pinion mechanism, when the first rotary frame 32 rotates about the rotation center line C, the second rotary frame 32 rotates in the opposite direction in conjunction therewith.

Note that the first rotary frame 32 is manually rotated in the case of the first embodiment. As illustrated in FIG. 4, the first rotary frame 32 is provided with a lever 32*f* operated by a user when rotating the first rotary frame 32. The lever 32*f* projects toward the rear casing 20 and is exposed to the outside of the casing 12 via an arcuate slot 20*b* formed in the rear casing 20 (see FIGS. 3A to 3C).

The first and second rotary frames 32 and 34 and the first and second lens covers 14 and 16 are connected.

As illustrated in FIGS. 5A and 5B, the first lens cover 14 includes a connection portion 14*a* (first connection portion) which is provided on one end side (one end side in the left-right direction (Y-axis direction)) and rotatably connected to the first rotary frame 32. In addition, the first lens cover 14 includes a connection portion 14*b* (second connection portion) which is provided on the other end side (the other end side in the left-right direction (Y-axis direction)) and rotatably connected to the second rotary frame 34. In the case of the first embodiment, the connection portions 14*a* and 14*b* are columnar pins.

Further, in the case of the first embodiment, the connection portion 14*a* is provided on an arm portion 14*c* (first arm portion) extending from one end of the first lens cover 14 (one end in the left-right direction (Y-axis direction)) toward the second lens cover 16, Further, the connection portion 14*b* is provided on an arm portion 14*d* (second arm portion) extending from the other end of the first lens cover 14 (the other end in the left-right direction (Y-axis direction)) toward the second lens cover 16. As a result, when the first and second lens covers 14 and 16 are in the fully closed state as illustrated in FIGS. 5A and 5B, the second lens cover 16 is located between the two connection portions 14*a* and 14*b* as viewed in the opening direction (X-axis direction) of the through-hole 12*a* of the casing 12. A reason for adopting such a configuration will be described later.

The second lens cover 16 includes a connection portion 16*a* (third connection portion) which is provided on one end side (one end side in the left-right direction (Y-axis direction)) and rotatably connected to the second rotary frame 34. In addition, the second lens cover 16 includes a connection portion 16*b* (fourth connection portion) which is provided on the other end side (the other end side in the left-right direction (Y-axis direction)) and rotatably connected to the first rotary frame 32. In the case of the first embodiment, the connection portions 16*a* and 16*b* are columnar pins.

Further, in the case of the first embodiment, the connection portion 16*a* is provided on an arm portion 16*c* (third arm portion) extending from one end of the second lens cover 16 (one end in the left-right direction (Y-axis direction)) toward the first lens cover 14. Further, the connection portion 16*b* is provided on an arm portion 16*d* (fourth arm portion) extending from the other end of the second lens cover 16 (the other end in the left-right direction (Y-axis direction)) toward the first lens cover 14. As a result, when the first and second lens covers 14 and 16 are in the fully closed state as illustrated in FIGS. 5A and 5B, the first lens cover 14 is located between the two connection portions 16*a* and 16*b* as viewed in the opening direction (X-axis direction) of the through-hole 12*a* of the casing 12. A reason for adopting such a configuration will be described later.

Further, in the case of the first embodiment, one arm portion 14*c* (first arm portion) of the first lens cover 14 and one arm portion 16*c* (third arm portion) of the second lens cover 16 overlap as viewed in the opening direction (X-axis direction) of the through-hole 12*a* of the casing 12 as illustrated in FIGS. 5A and 5B. Specifically, these arm portions overlap such that the arm portion 14*c* of the first lens cover 14 is located close to the first rotary frame 32 and the arm portion 16*c* of the second lens cover 16 is located close to the second rotary frame 34, A reason for adopting such a configuration will be described later.

Similarly, the other arm portion 14*d* (second arm portion) of the first lens cover 14 and the other arm portion 16*d* (fourth arm portion) of the second lens cover 16 overlap as viewed in the opening direction (X-axis direction) of the through-hole 12*a* of the casing 12 as illustrated in FIGS. 5A and 5B. Specifically, these arm portions overlap such that the arm portion 14*d* of the first lens cover is located close to the second rotary frame 34 and the arm portion 16*d* of the second lens cover 16 is located close to the first rotary frame 32. A reason for adopting such a configuration will be described later.

As illustrated in FIGS. 5B and 6, the first rotary frame 32 includes elongated holes 32*g* and 32*h* in order to connect the connection portion 14*a* (first connection portion) of the first lens cover 14 and the connection portion 16*b* (fourth connection portion) of the second lens cover 16 in the case of the first embodiment.

The elongated hole 32*g* holds the connection portion 14*a* of the first lens cover 14 to be rotatable and displaceable, so that the first lens cover 14 and the first rotary frame 32 are connected. Further, the elongated hole 32*h* holds the connection portion 16*b* of the second lens cover 16 to be rotatable and displaceable, so that the second lens cover 16 and the first rotary frame 32 are connected. Note that the elongated holes 32*g* and 32*h* oppose each other with the rotation center line C of the first rotary frame 32 interposed between, and have the same distance to the rotation center line C, Further, grooves may be used instead of the elongated holes 32*g* and 32*h*.

As illustrated in FIGS. 5A and 7, the second rotary frame 34 includes circular holes 34*f* and 34*g* in order to connect the connection portion 14*b* (second connection portion) of the first lens cover 14 and the connection portion 16*a* (third connection portion) of the second lens cover 16 in the case of the first embodiment.

The circular hole 34*f* rotatably holds the connection portion 14*b* of the first lens cover 14, so that the first lens cover 14 and the second rotary frame 34 are connected. Further, the circular hole 34*g* rotatably holds the connection portion 16*a* of the second lens cover 16, so that the second lens cover 16 and the second rotary frame 34 are connected. Note that the circular holes 34*f* and 34*g* oppose each other with the rotation center line C of the second rotary frame 34 interposed between, and have the same distance to the rotation center line C.

The configuration of the lens barrier unit 30 has been described so far. Hereinafter, an operation of the lens barrier unit 30 will be described with reference to FIGS. 9A to 9C and FIGS. 10A to 10C.

Figure 9B:
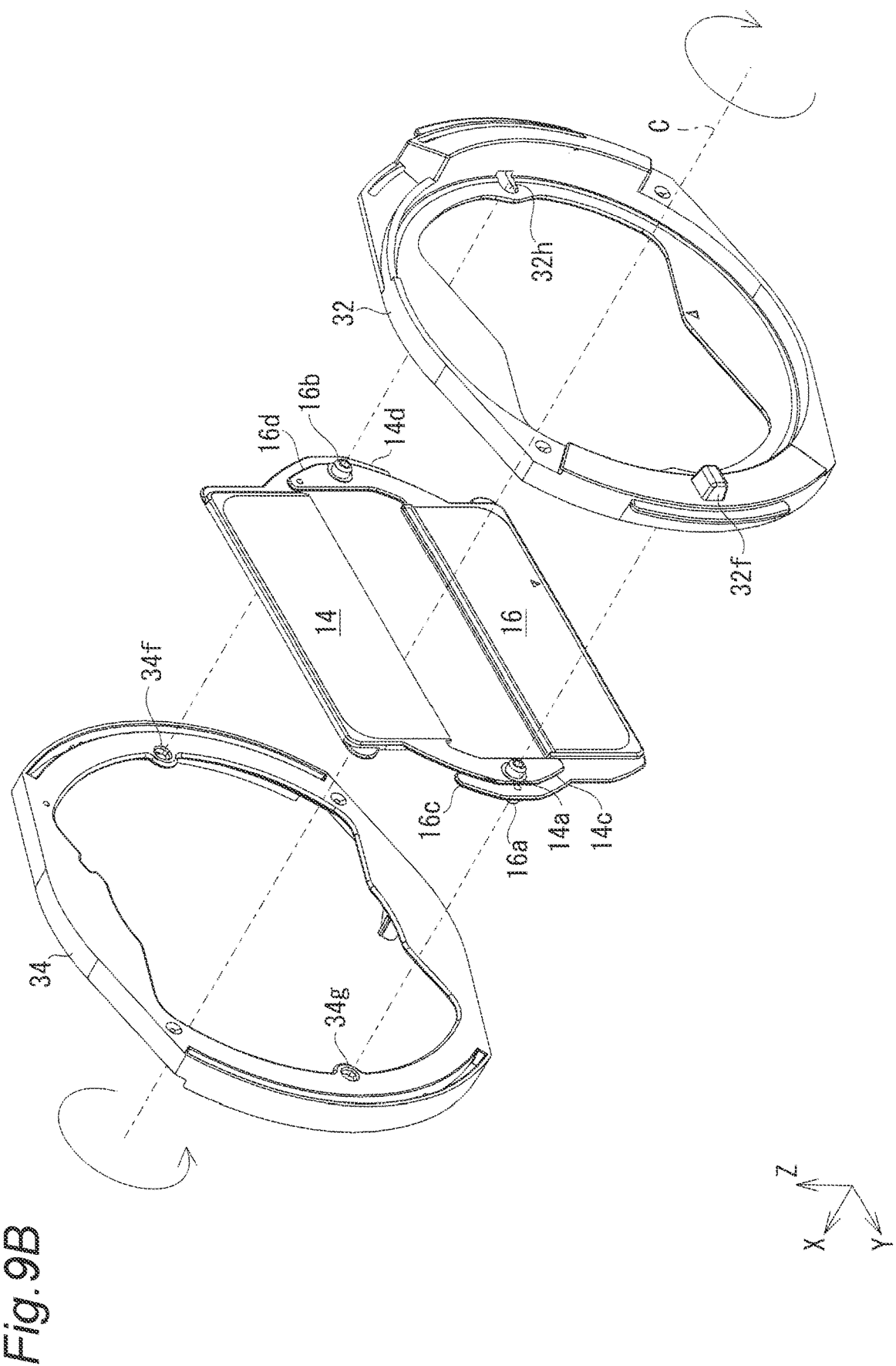
FIG. 9B is a perspective view illustrating the first and second lens covers and the first and second rotary frames in the half-open state.
Figure 9C:
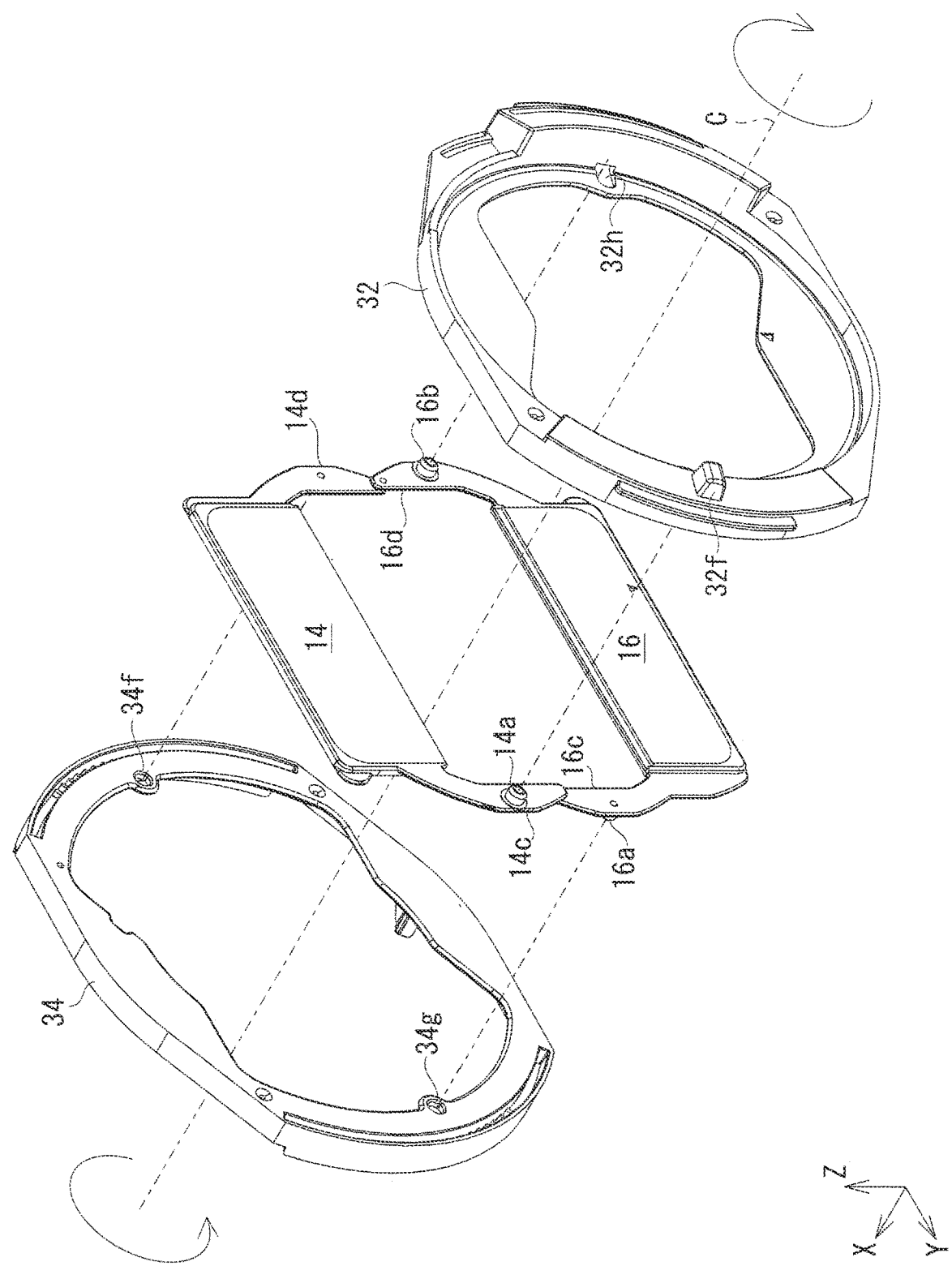
FIG. 9C is a perspective view illustrating the first and second lens covers and the first and second rotary frames in the fully open state.

FIG. 9A is a perspective view illustrating the first and second lens covers and the first and second rotary frames in the fully closed state. FIG. 9B is a perspective view illustrating the first and second lens covers and the first and second rotary frames in the half-open state. FIG. 9C is a perspective view illustrating the first and second lens covers and the first and second rotary frames in the fully open state.

Figure 10A:
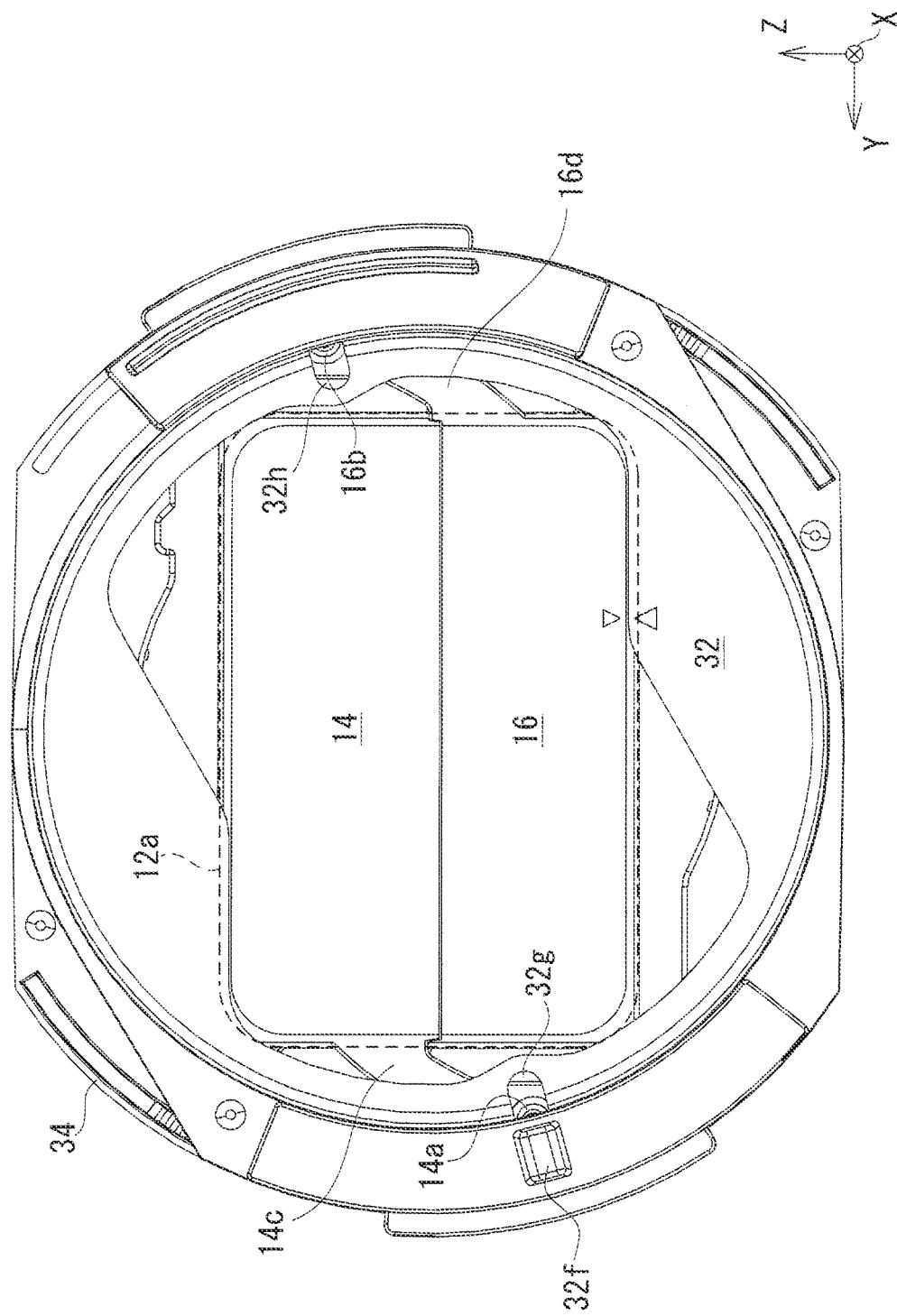
FIG. 10A is a rear view illustrating the first and second lens covers and the first and second rotary frames in the fully closed state.
Figure 10B:
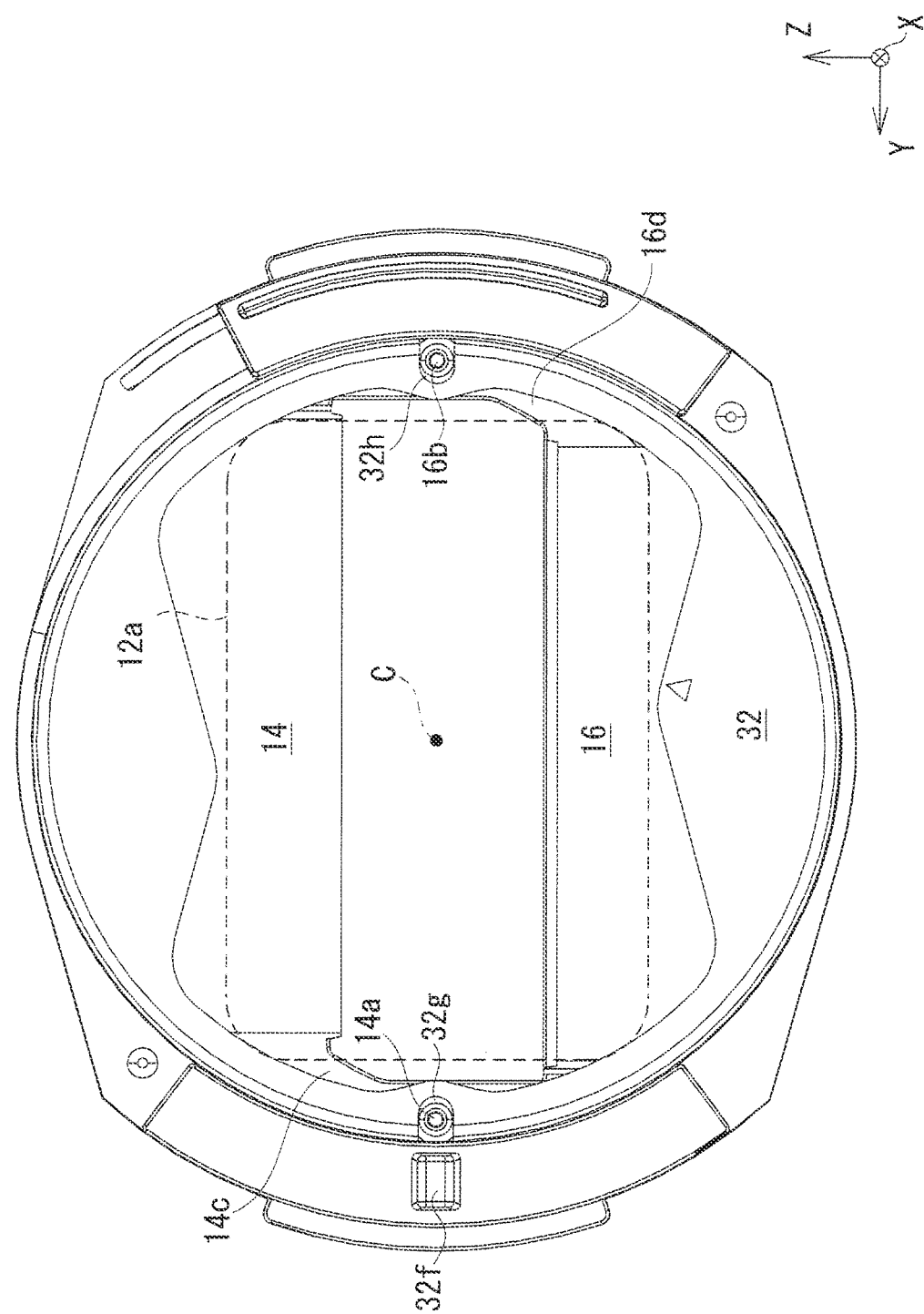
FIG. 10B is a rear view illustrating the first and second lens covers and the first and second rotary frames in the half-open state.
Figure 10C:
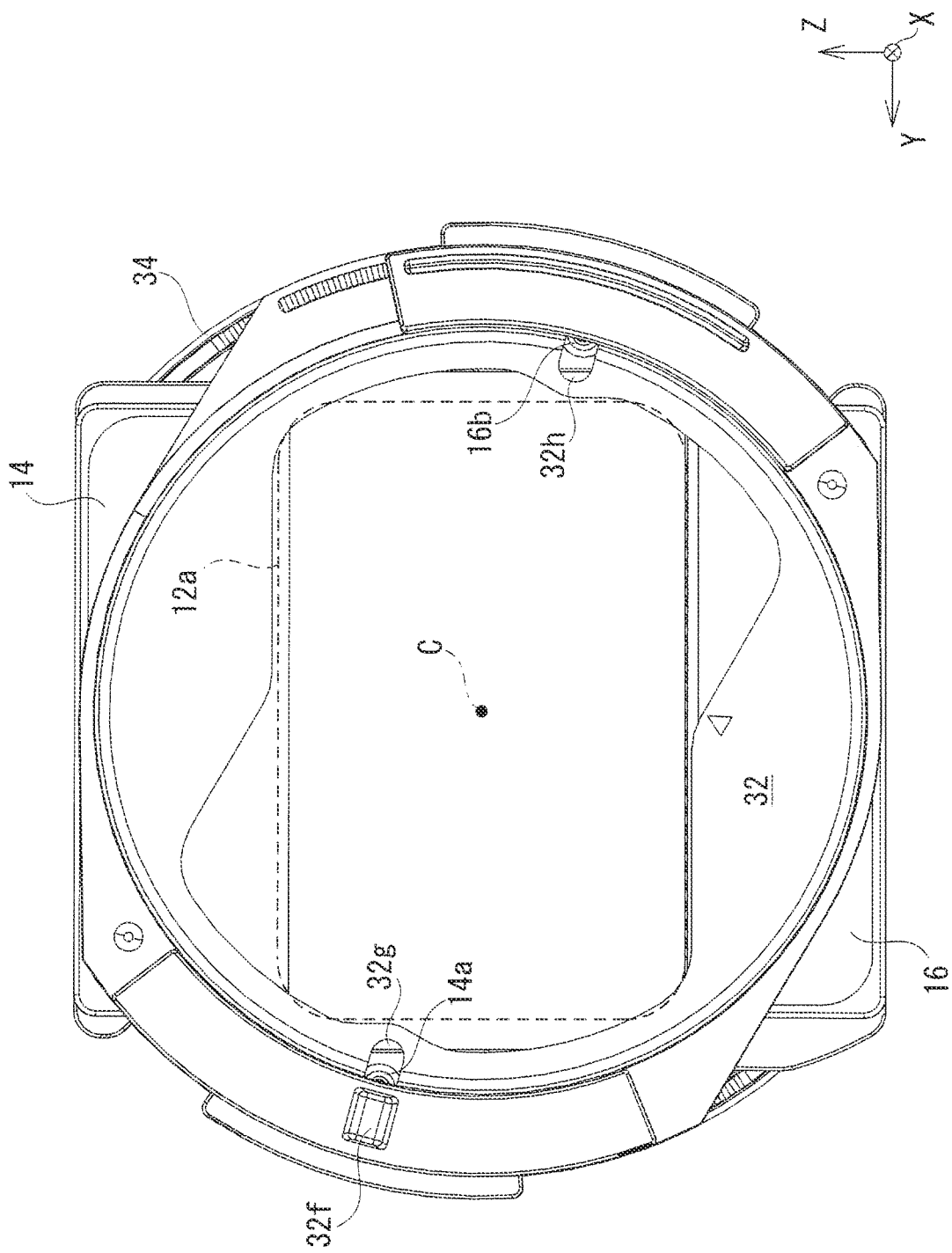
FIG. 10C is a rear view illustrating the first and second lens covers and the first and second rotary frames in the fully open state.

Further, FIG. 10A corresponds to FIG. 9A and is a rear view illustrating the first and second lens covers and the first and second rotary frames in the fully closed state. FIG. 10B corresponds to FIG. 9B and is a rear view illustrating the first and second lens covers and the first and second rotary frames in the half-open state. FIG. 10C corresponds to FIG. 9C and is a rear view illustrating the first and second lens covers and the first and second rotary frames in the fully open state.

As illustrated in FIGS. 9A and 10A, the first and second lens covers 14 and 16 are in contact with each other in the fully closed state. When the user operates the lever 32f to rotate the first rotary frame 32 in the clockwise-rotation direction (in the rear view) from this state, the second rotary frame 34 rotates in the counterclockwise-rotation direction via the pinion gears 42 and 44. As a result, the connection portion 14a (that is, the arm portion 14c) of the first lens cover 14 held in the elongated hole 32g of the first rotary frame 32 ascends. At the same time, the connection portion 14b (that is, the arm portion 14d) of the first lens cover 14 held in the circular hole 34f of the second rotary frame 34 also ascends. As a result, the entire first lens cover 14 is substantially translated upward (to one side in the up-down direction (Z-axis direction)).

On the other hand, the connection portion 16b (that is, the arm portion 16d) of the second lens cover 16 held in the elongated hole 32h of the first rotary frame 32 descends, unlike the connection portion 14a of the first lens cover 16. At the same time, the connection portion 16a (that is, the arm portion 16c) of the second lens cover 16 held in the circular hole 34g of the second rotary frame 34 also descends. As a result, the entire second lens cover 16 is substantially translated downward (to the other side in the up-down direction (Z-axis direction)).

When the user operates the lever 32f to further rotate the first rotary frame 32 in the clockwise-rotation direction, the rotation center line C of the first and second rotary frames 32 and 34 and the connection portions 14a, 14b, 16a, and 16b of the first and second lens covers 14 and 16 held by these rotary frames are arranged substantially on the same plane as illustrated in FIGS. 9B and 10B. At this time, the first and second lens covers 14 and 16 are in the half-open state.

When the user further rotates the first rotary frame 32 in the clockwise-rotation direction from the half-open state, the connection portions 14a and 14b of the first lens cover 14 are arranged above the connection portions 16a and 16b of the second lens cover 16 as illustrated in FIGS. 9C and 10C. As a result, the first and second lens covers 14 and 16 are set in the fully open state.

Note that the transition from the fully open state to the fully closed state is executed as the user operates the lever 32f to rotate the first rotary frame 32 in the counterclockwise-rotation direction.

Further, in the case of the first embodiment, a plurality of torsion springs 46 and 48 bias the second rotary frame 34 as illustrated in FIG. 4 so as to maintain the fully open state or the fully closed state, that is, to prevent the first and second lens covers 14, 16 from moving freely. One ends of the torsion springs 46 and 48 are inserted into spring support holes 18b and 18c of the front casing 18. Further, the other ends of the torsion springs 46 and 48 are inserted into spring support holes 34h and 34i of the second rotary frame 34 as illustrated in FIG. 5B.

According to the first embodiment as described above, it is possible to reduce a size of the lens hood 10 including the lens covers 14 and 16.

Specifically, as illustrated in FIGS. 9A to 9C, the through-hole 12a of the casing 12 is open and closed by moving the first and second lens covers 14 and 16 in the up-down direction (Z-axis direction) of the lens hood 10. That is, the first and second lens covers 14 and 16 open and close the through-hole 12a without moving in the front-rear direction (X-axis direction) of the lens hood 10. As a result, the size of the lens hood 10 can be reduced, particularly, the size of the lens hood 10 in the front-rear direction (X-axis direction) can be reduced (as compared to a case where a lens cover moves in the front-rear direction for opening and closing).

Further, the size of the lens hood 10 in the left-right direction (Y-axis direction) is also preferably reduced in the case of the first embodiment.

Figure 11:
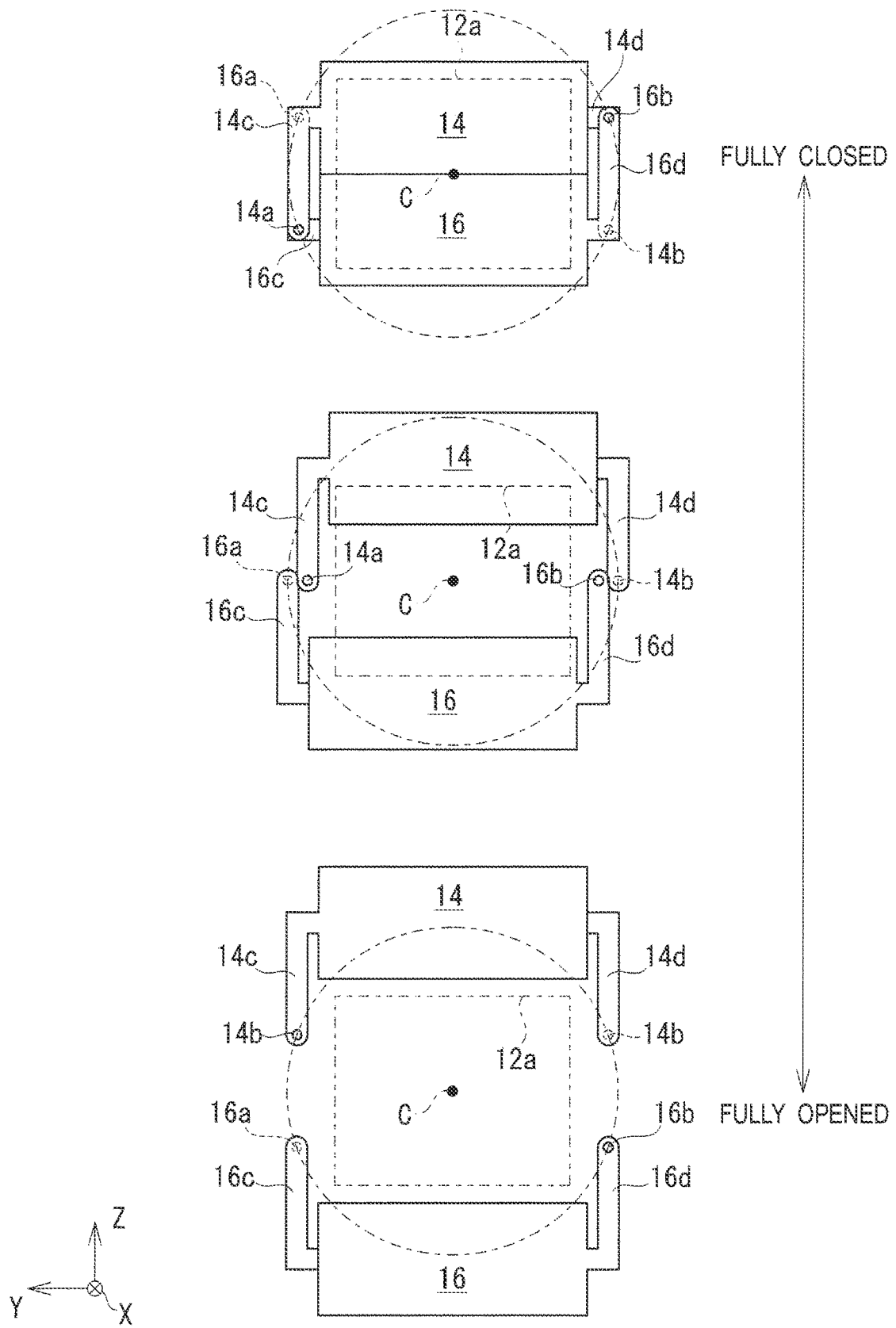
FIG. 11 is a view schematically illustrating movements of the first and second lens covers in the lens hood according to the first embodiment.
Figure 12:
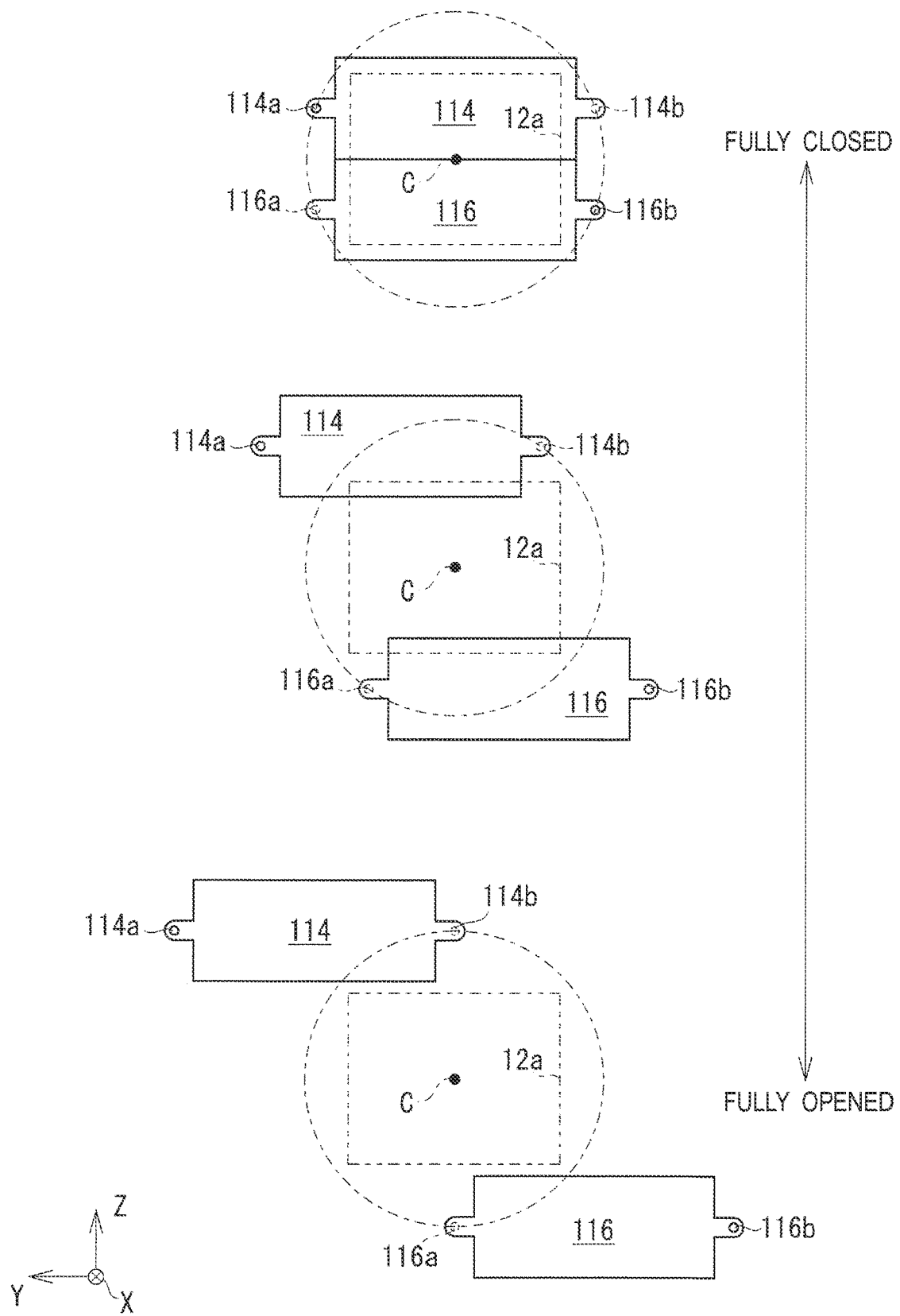
FIG. 12 is a view schematically illustrating movements of first and second lens covers in a lens hood according to another second embodiment.
Figure 13:
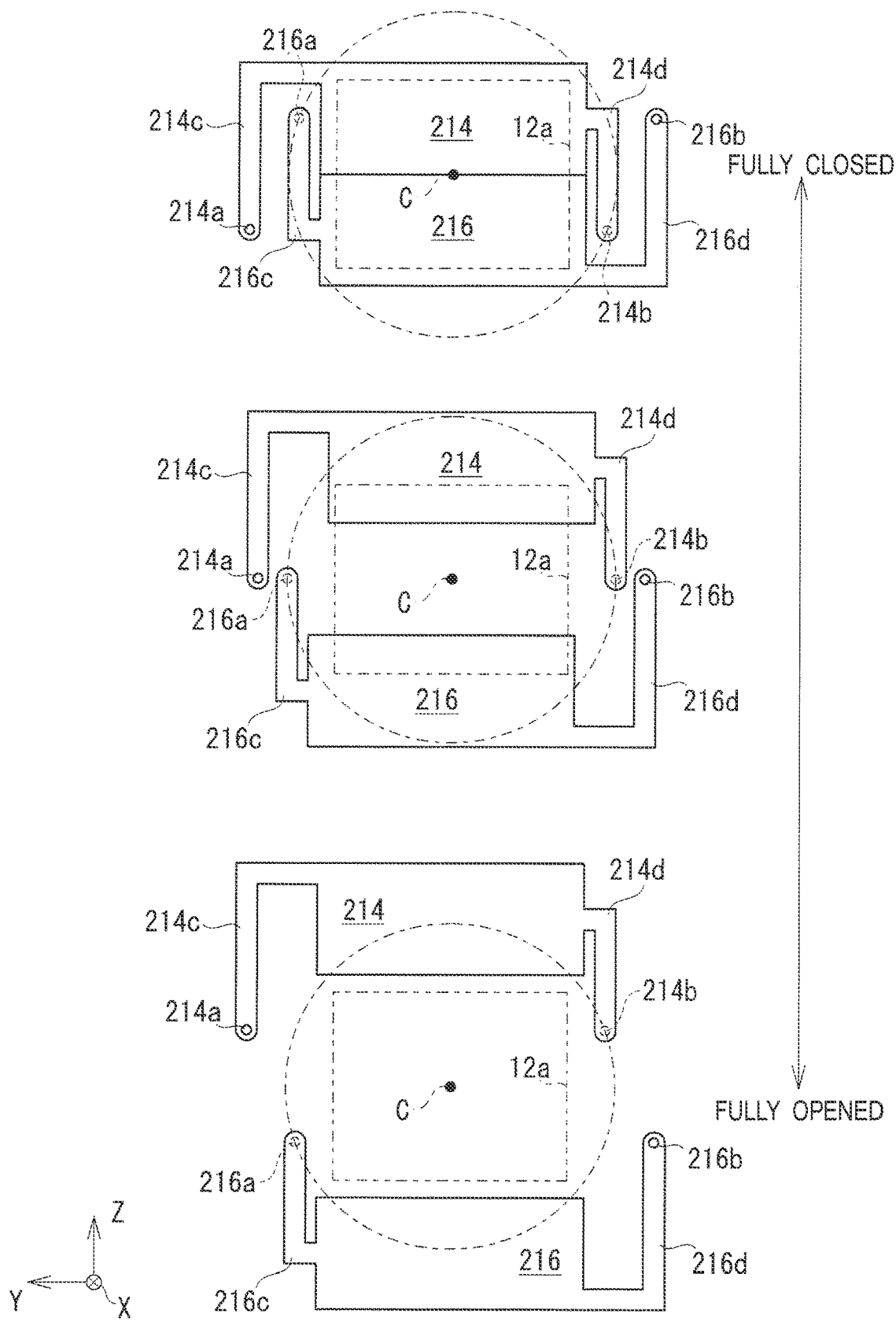
FIG. 13 is a view schematically illustrating movements of first and second lens covers in a lens hood according to still another third embodiment.

FIG. 11 schematically illustrates movements of the first and second lens covers in the lens hood according to the first embodiment. Further, FIG. 12 schematically illustrates movements of first and second lens covers in a lens hood according to another second embodiment. Further, FIG. 13 schematically illustrates movements of first and second lens covers in a lens hood according to still another third embodiment.

As illustrated in FIG. 11, in the case of the lens hood 10 according to the first embodiment, as a first feature, the second lens cover 16 is located between the connection portions 14a and 14b of the first lens cover 14 connected to the first and second rotary frames 32 and 34 and the first lens cover 14 is located between the connection portions 16a and 16b of the second lens cover 16, as viewed in the opening direction of the through-hole 12a (the X-axis direction). Therefore, the first and second lens covers 14 and 16 are open and closed in the up-down direction (Z-axis direction) without significantly moving in the left-right direction (Y-axis direction).

Further, as a second feature, the arm portions 14c and 14d of the first lens cover 14 and the arm portions 16c and 16d of the second lens cover 16 overlap at least in the fully closed state as viewed in the opening direction (X-axis direction) of the through-hole 12a.

With these two features, the lens hood 10 according to the present embodiment is also reduced in size in the left-right direction (Y-axis direction) of the lens hood 10.

In the case of the lens hood according to another second embodiment illustrated in FIG. 12, a first lens cover 114 includes connection portions 114a and 114b for connections to the first and second rotary frames at both ends in the left-right direction (Y-axis direction). Similarly, a second lens cover 116 includes connection portions 116a and 116b for connections to the first and second rotary frames at both ends in the left-right direction.

In the case of the lens hood according to this another second embodiment, the first and second lens covers 114 and 116 move in opposite directions in the left-right direction (Y-axis direction) while separating from each other in the up-down direction (Z-axis direction) when transitioning from the fully closed state to the fully open state. Therefore, elongated holes of the first rotary frame that hold the connection portion 114a of the first lens cover 114 and the connection portion 116b of the second lens cover 116 become long, and as a result, the first rotary frame becomes larger (as compared to the first embodiment). As a result, the reduction in size of the lens hood is restricted in the left-right direction in the second embodiment. However, the lens hood according to the second embodiment is also reduced in size in the front-rear direction (X-axis direction), which is similar to the first embodiment.

In the case of the lens hood according to still another third embodiment illustrated in FIG. 13, a second lens cover 216 is located between connection portions 214a and 214b of a first lens cover 214 in the fully closed state as viewed in the opening direction (X-axis direction) of the through-hole 12a, which is similar to the above-described first embodiment. Further, the first lens cover 214 is located between connection portions 216a and 216b of the second lens cover 216.

However, arm portions 214c and 214d of the first lens cover 214 and arm portions 216c and 216d of the second lens cover 216 do not overlap at least in the fully closed state as viewed in the opening direction (X-axis direction) of the through-hole 12a, unlike the first embodiment.

In the case of the lens hood according to this still another third embodiment, the amount of movement of the first and second lens covers 214 and 216 in the left-right direction (Y-axis direction) when transitioning from the fully closed state to the fully open state is substantially the same as the amount of movement of the first and second lens covers 14 and 16 in the lens hood 10 according to the first embodiment. However, sizes of the first and second lens covers including the arm portions in the left-right direction are larger in the third embodiment than those in the first embodiment. As a result, the reduction in size of the lens hood according to the third embodiment is somewhat restricted in the left-right direction. However, the lens hood according to the third embodiment is also reduced in size in the front-rear direction (X-axis direction), which is similar to the first embodiment.

Although the above-described embodiments have been described above, embodiments of the present disclosure are not limited to the above-described embodiments.

For example, the first and second lens covers are open and closed in the up-down direction (Z-axis direction) of the lens hood in the case of the first embodiment, but the embodiments of the present disclosure is not limited thereto. The first and second lens covers may be open and closed in the left-right direction (Y-axis direction) of the lens hood. That is, it suffices that the first and second lens covers are open and closed in a direction intersecting the opening direction of the through-hole of the lens hood.

Further, in the case of the first embodiment, the first rotary frame is rotated by the user, and the second rotary frame is rotated in conjunction with the rotation of the first rotary frame. Alternatively, the second rotary frame may be rotated by the user. Further, these rotary frames may be rotated not manually by the user but by, for example, a motor. That is, it suffices that the first and second rotary frames rotate in the opposite directions in conjunction with each other in the lens hoods according to the embodiments of the present disclosure.

Further, the first rotary frame 32 and the second rotary frame 34 rotate in the opposite directions in conjunction with each other by the rack and pinion mechanism in the case of the first embodiment as illustrated in FIG. 8. However, the embodiments of the present disclosure are not limited thereto. Alternatively, one of the first and second rotary frames may be provided with internal teeth and the other may be provided with external teeth, and a gear may be provided between the internal teeth and the external teeth.

That is, in a broad sense, the lens hood according to an embodiment of the present disclosure includes: a casing provided with a through-hole; first and second rotary frames which are arranged side by side in an opening direction of the through-hole and rotate in opposite directions in conjunction with each other; and first and second lens covers which approach or separate from each other to close or open the through-hole. The first lens cover includes a first connection portion that is provided on one end side and rotatably connected to the first rotary frame, and a second connection portion that is provided on another end side and rotatably connected to the second rotary frame. The second lens cover includes a third connection portion that is provided on one end side and rotatably connected to the second rotary frame, and a fourth connection portion that is provided on another end side and rotatably connected to the first rotary frame.

As described above, the above-described embodiments have been described as examples of techniques in the present disclosure. To this extent, the drawings and detailed descriptions are provided. Therefore, components described in the drawings and the detailed description include not only components indispensable to solve the problem, but may also include components not necessarily indispensable to solve the problem in order to provide examples of the techniques. Therefore, those components not necessarily indispensable should not be deemed essential due to the mere fact that those components not necessarily indispensable are described in the drawings and the detailed description.

Since the above-described embodiments are given as the examples of the techniques according to the present disclosure, various modifications, replacements, additions, omissions, or the like can be made within the scope of the claims or in a scope equivalent to the scope of the claims.

The present disclosure is applicable to a lens hood that is permanently or detachably attached to a lens barrel such as an imaging apparatus.

What is claimed is:

1. A lens hood comprising:
a casing provided with a through-hole;
first and second rotary frames which are arranged side by side in an opening direction of the through-hole and rotate in opposite directions in conjunction with each other; and
first and second lens covers which approach or separate from each other to close or open the through-hole,
wherein the first lens cover includes a first connection portion that is provided on one end side and rotatably connected to the first rotary frame, and a second connection portion that is provided on another end side and rotatably connected to the second rotary frame, and
the second lens cover includes a third connection portion that is provided on one end side and rotatably connected to the second rotary frame, and a fourth connection portion that is provided on another end side and rotatably connected to the first rotary frame.

2. The lens hood according to claim 1, wherein
the first lens cover includes a first arm portion that extends from one end toward the second lens cover and is provided with the first connection portion, and a second arm portion that extends from another end toward the second lens cover and is provided with the second connection portion, the second lens cover includes a third arm portion that extends from one end toward the first lens cover and is provided with the third connection portion, and a fourth arm portion that extends from another end toward the first lens cover and is provided with the fourth connection portion, in a fully closed state of the first and second lens covers, the second lens cover is located between the first and second connection portions and the first lens cover is located between the third and fourth connection portions as viewed in the opening direction of the through-hole.

3. The lens hood according to claim 2, wherein as viewed in the opening direction of the through-hole, the first arm portion and the third arm portion overlap, and the second arm portion and the fourth arm portion overlap.

4. The lens hood according to claim 1, wherein the first, second, third, and fourth connection portions are columnar pins, the first rotary frame includes a plurality of elongated holes or grooves respectively holding the first and fourth connection portions to be rotatable and displaceable, and the second rotary frame includes circular holes respectively holding the second and third connection portions to be rotatable.

5. The lens hood according to claim 1, further comprising a pinion gear provided between the first rotary frame and the second rotary frame, wherein each of the first and second rotary frames includes rack teeth that mesh with the pinion gear.

6. The lens hood according to claim 1, wherein the first rotary frame includes a lever operated by a user when rotating the first rotary frame.

7. An imaging apparatus comprising:

the lens hood according to claim 1; and a lens barrel to which the lens hood is attached.

\* \* \* \* \*